(12) United States Patent
Traskos et al.

(10) Patent No.: US 6,574,075 B2
(45) Date of Patent: Jun. 3, 2003

(54) LIQUID CRYSTAL POLYMER DISK DRIVE SUSPENSION ASSEMBLY AND METHOD OF MANUFACTURE THEREOF

(75) Inventors: Richard T. Traskos, Brooklyn, CT (US); Bruce G. Kosa, Woodstock, CT (US); Michael E. St. Lawrence, Thompson, CT (US)

(73) Assignee: World Properties, Inc., Lincolnwood, IL (US)

( * ) Notice: Subject to any disclaimer, the term of this patent is extended or adjusted under 35 U.S.C. 154(b) by 0 days.

(21) Appl. No.: 10/017,708

(22) Filed: Dec. 12, 2001

(65) Prior Publication Data

US 2002/0114107 A1 Aug. 22, 2002

Related U.S. Application Data

(63) Continuation-in-part of application No. 09/413,221, filed on Oct. 5, 1999, now Pat. No. 6,356,414.
(60) Provisional application No. 60/105,212, filed on Oct. 22, 1998.

(51) Int. Cl.[7] .............................................. G11B 21/16
(52) U.S. Cl. ..................................................... 360/244.3
(58) Field of Search ........................... 360/244.3, 244.4, 360/245.9

(56) References Cited

U.S. PATENT DOCUMENTS

| | | |
|---|---|---|
| 4,543,295 A | 9/1985 | St. Clair et al. |
| 4,991,045 A | 2/1991 | Oberg |
| 5,142,390 A | 8/1992 | Ohta et al. |
| 5,145,553 A | 9/1992 | Albrechta et al. |
| 5,187,625 A * | 2/1993 | Blaeser et al. |
| 5,426,549 A | 6/1995 | Sakai |
| 5,427,848 A | 6/1995 | Baer et al. |
| 5,443,753 A | 8/1995 | Elliot |
| 5,610,785 A | 3/1997 | Aoyagi et al. |
| 5,627,704 A | 5/1997 | Lederman et al. |
| 5,666,241 A | 9/1997 | Summers |
| 5,668,684 A | 9/1997 | Palmer et al. |
| 5,712,749 A | 1/1998 | Gustafson |
| 5,731,401 A | 3/1998 | Gupta et al. |
| 5,748,409 A | 5/1998 | Girard et al. |
| 5,754,370 A | 5/1998 | Tsuchiya et al. |
| 5,771,135 A | 6/1998 | Ruiz et al. |
| 5,933,406 A * | 8/1999 | Ikegame |
| 6,046,886 A * | 4/2000 | Himes et al. |

FOREIGN PATENT DOCUMENTS

| | | |
|---|---|---|
| EP | 172012 A | 2/1986 |
| EP | 178836 B | 4/1986 |
| EP | 206600 B | 12/1986 |
| EP | 323008 A | 7/1989 |
| GB | 2227855 A | 8/1990 |
| JP | 62-177082 A | 8/1987 |
| JP | 01-031835 A | 2/1989 |
| JP | 01-261420 A | 10/1989 |
| JP | 01-281915 A | 11/1989 |
| JP | 02-136292 A | 5/1990 |
| JP | 04-293786 A | 10/1992 |
| JP | 04-293787 A | 10/1992 |
| JP | 05-125258 A | 5/1993 |
| JP | 08-113719 A | 5/1996 |
| JP | 08-180353 | 7/1996 |
| JP | 09-124771 A | 5/1997 |
| WO | WO 9000674 A | 1/1990 |
| WO | WO 9205953 A | 4/1992 |
| WO | WO 96/08361 | 3/1996 |
| WO | WO 9801511 A | 1/1998 |
| WO | WO 9809319 A | 3/1998 |

* cited by examiner

Primary Examiner—Craig A. Renner
(74) Attorney, Agent, or Firm—Cantor Colburn LLP

(57) ABSTRACT

A load beam for a suspension assembly comprises a liquid crystal polymer layer disposed between and in intimate contact with a first metal layer and a second metal layer, preferably stainless steel. Such load beams have improved dimensional and hygrothermal stability, as well as greater ease of processing over conventional load beams, allowing tailoring of bend and flex properties.

13 Claims, 4 Drawing Sheets

LIQUID CRYSTAL POLYMER DISK DRIVE SUSPENSION ASSEMBLY AND METHOD OF MANUFACTURE THEREOF

CROSS-REFERENCE TO RELATED APPLICATIONS

This application claims the benefit of the filing date of U.S. application Ser. No. 09/413,221, filed on Oct. 5, 1999, now U.S. Pat. No. 6,356,414, which in turn claims the benefit of the filing date of U.S. Provisional Application Serial No. 60/105,212 filed Oct. 22, 1998, the entire contents of both applications being incorporated herein by reference.

TECHNICAL FIELD

The present invention relates to disk drive suspension assemblies, and especially relates to liquid crystal polymer disk drive suspension assemblies and load beams therefor.

BACKGROUND OF INVENTION

Disk drive suspension assemblies provide flexible support for electronic devices in order to support an electrical connection between a magnetic head and disk drive such as those used in computer equipment. Essentially, the suspension assembly is a very precise metal spring with connecting circuitry that holds recording heads at microscopic distances away from a disk in a rotatable storage device, i.e. a disk drive. The suspension is critical to the operation of the device. The assembly, which has been increasingly important in attaining better device performance, including greater data storage capacity, faster access to data, and increasing reliability, enables the magnetic head to be located close to the device without damaging the head as a result of contact with the rotating device.

One conventional disk drive suspension assembly includes a stainless steel foil member for providing spring action, a layer of polymeric, dielectric material (typically polyimide) thereon with the appropriate circuit pads and circuit lines located on the polymeric material.

U.S. Pat. No. 5,145,553 to Albrechta et al. discloses a disk drive suspension assembly having a stainless steel base member, a dielectric layer (polyimide) on the base member and a conductive circuit (copper) on the dielectric layer. The copper-containing circuitry and stainless steel base member are simultaneously etched using a cupric chloride etchant solution to effectively remove desired portions of these metallic materials and produce the desired flexible circuit member. Although this disk drive suspension assembly is particularly usefull in the computer industry, its sensitivity to atmospheric changes, such as temperature and relative humidity (hygrothermal conditions) reduces computer tolerances, thereby limiting its usefulness under varying conditions. What is needed in the art is an improved rotatable data storage suspension assembly and a load beam that is readily produced and possesses improved hygrothermal properties, and electrical performance.

Recent advances in disk drive technology have led to changes in the construction of suspension assemblies, resulting in more complex suspension assemblies. Such suspension assemblies typically comprise a front portion and a rear portion, usually referred to as a mount plate. The front portion usually comprises a circuit element and a load beam. The front portion may be conceptually divided into two parts, a flexible hinge portion and a slider support portion. The flexible hinge portion is generally attached to one end of the rear portion. The other end of the rear portion has means for pivotally mounting the suspension assembly to the disk drive frame The circuit element connects the read/write head to the read/write control circuit. The load beam provides the major structural support for the suspension assembly and must do so while also providing localized flexibility. As data tracks become narrower and closer together, the load beam materials need the capability to be locally tailored (typically by selectively removing material) to provide the varying amounts of bend and stiffness required at different locations along the load beam. This selective removal is done either by industry standard processes such as chemical etching or plasma depending upon materials involved. Furthermore the load beam needs excellent hygrothermal stability properties so as to perform consistently regardless of environmental conditions. As current load beams are typically either just stainless steel or a polymer sandwiched between two stainless steel layers, it is has been difficult to modify current load beams to meet these requirements. Accordingly there remains a need in the for materials for use as load beams that that can be adjusted to provide characteristics such as localized bend and flex, as well as improved hygrothermal properties.

SUMMARY

The present invention relates to a liquid crystal polymer disk drive suspension assembly and a method for making the same. The assembly comprises: a support; an electrically conductive layer; and a dielectric liquid crystal polymer material disposed between, in intimate contact with, and adhered to the support and the conductive layer.

The method for making the suspension assembly of the present invention comprises: forming a dielectric liquid crystal polymer film; disposing said liquid crystal polymer film between a support and an electrically conductive layer; and bonding the liquid crystal polymer layer to the electrically conductive layer and said support.

In another embodiment, a suspension assembly comprises a mount plate having a load beam mounted thereon, and a circuit element disposed on a load beam, wherein the load beam comprises a liquid crystal polymer layer disposed between and in intimate contact with a first metal layer and a second metal layer. Such load beams may be tailored to provide localized blend and flex, and have excellent hygrothermal properties.

These and other objects, features and advantages of the present invention will be apparent from the following brief description of the drawings, detailed description, appended claims, and drawings.

DESCRIPTION OF THE DRAWINGS

The present invention will now be described, by way of example only, with reference to the accompanying drawings which are meant to be exemplary, not limiting, and wherein like elements are numbered alike in several Figures, in which.

DETAILED DESCRIPTION

Figure 1:
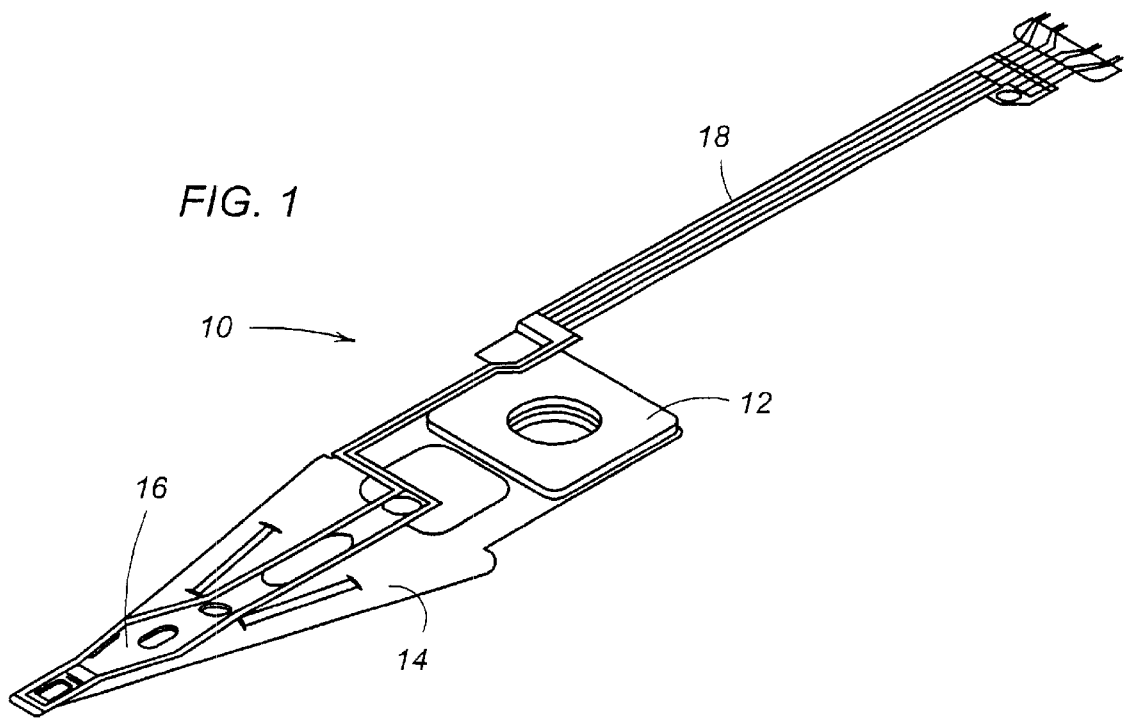
FIG. 1 is an illustration of a disk drive assembly.
Figure 2:
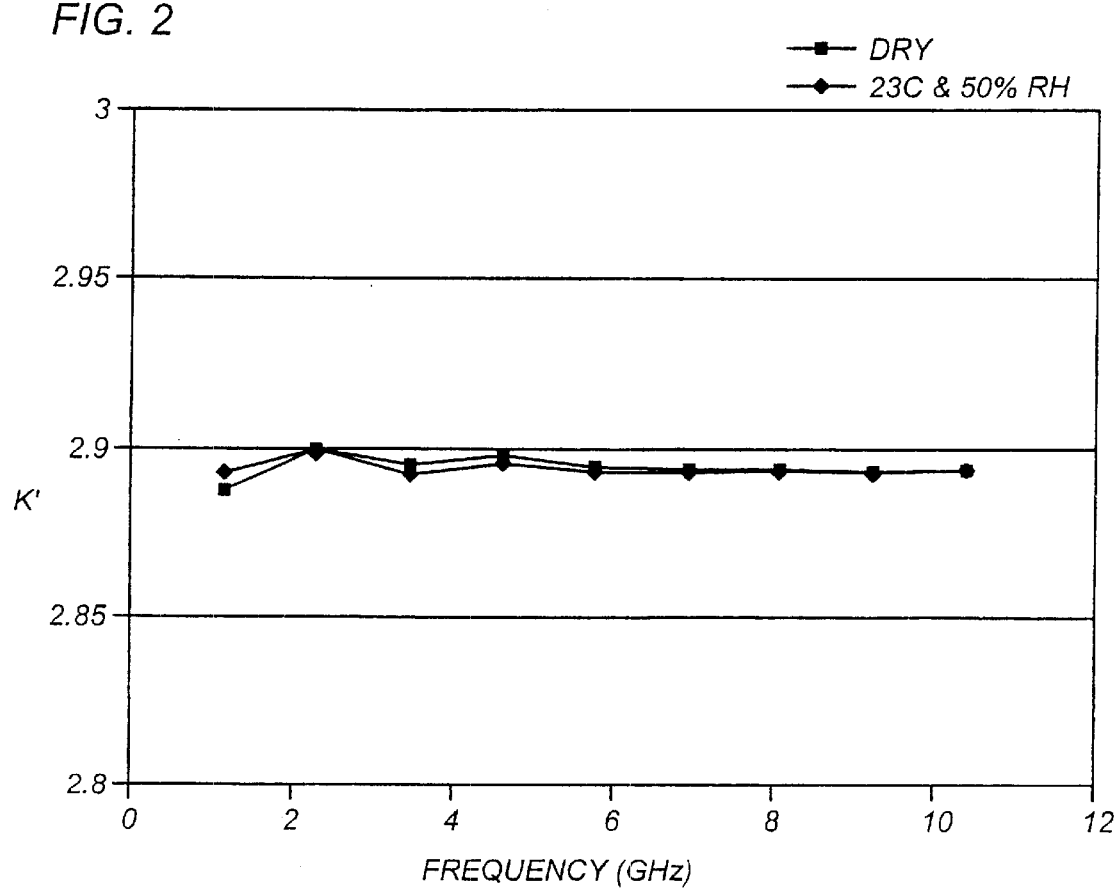
FIGS. 2–5 are graphs illustrating dielectric constant variation based on dry conditions, 50% relative humidity at 23° C., and immersion in water at 50° C., for the liquid crystal polymer assembly of the present invention.
Figure 3:
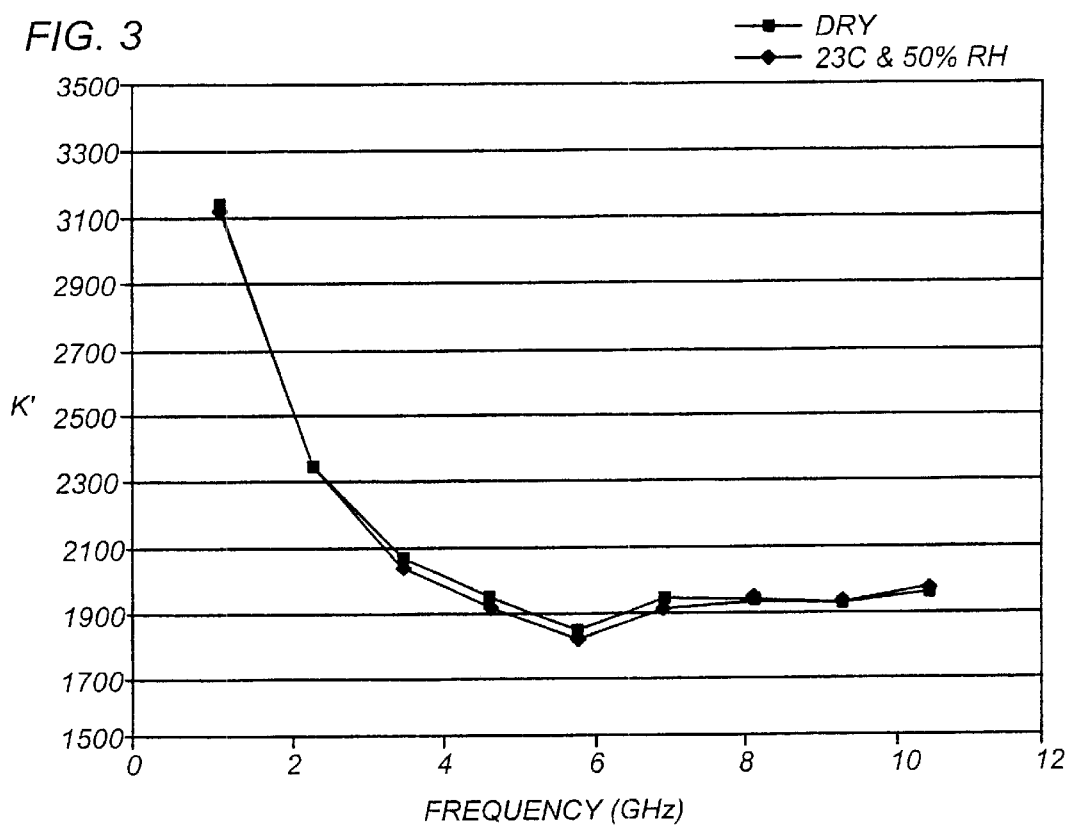

Referring now to FIG. 1, a disk drive trace assembly 10 is illustrated. The disk drive trace assembly 10 comprises a flexure 16 having an electrically conductive material (or layer), such as stainless steel or copper, and incorporating a liquid crystal polymer adhered to a flexible support 14. The disk drive trace assembly 10 also comprises a base plate (or attachment) 12 and a tail 18, which can optionally be apart of the flexure 16.

The present invention relates to a rotatable storage device suspension assembly and method for making the same. The assembly comprises a support, an electrically conductive layer and a dielectric liquid crystal polymer layer disposed therebetween. A method of making the suspension assembly comprises disposing a liquid crystal polymer film between a support and an electrically conductive layer and bonding, preferably by laminating, the liquid crystal polymer film thereto. The support provides sufficient stiffness and structural integrity to the assembly while also providing sufficient elasticity. Any conventional suspension assembly support material can be employed which is compatible with the operating environment and preferably has a modulus of elasticity exceeding about $1.5 \times 10^7$ mN/mm$^2$ (milliNewton per square millimeter), a tensile strength exceeding about $1 \times 10^6$ mN/mm$^2$, a yield strength exceeding about $1 \times 10^6$ mN/mm$^2$, and a percent elongation of up to about 10% with up to about 5% preferred, at the desired thickness. Possible supports include, but are not limited to, beryllium-copper, titanium, copper, zinc, stainless steel, alloys thereof, and others, with stainless steel preferred. These supports may have a corrosion resistant coating. For example, the support can be a commercial grade stainless steel such as A.I.S.I. (American Iron and Steel Institute) 302 grade steel, A.S.T.M. (American Society for Testing of Materials) designations A-167 and A-240 stainless steels, among others known in the art with optional corrosion resistant coatings comprising principally of chrome, zinc, brass, or another conventional corrosion resistant materials possible. Typically, the support has a thickness of up to about 5.0 mils, with a thickness of less than about 1.5 mil preferred, and a thickness of less than about 1.0 mil especially preferred.

Although the support can be directly coated with a liquid crystal polymer, thru a conventional process such as solution casting or melt extrusion, it is preferred to prepare a separate film of a liquid crystal polymer and combine it with a support and conductive layer through lamination. Important characteristics of the desired liquid crystal polymer film include: elasticity, sufficient thickness to attain the desired impedance, sufficient thinness not to adversely effect the flexural properties of the support, uniformity of thickness, low dielectric constant (i.e. less than about 4.0), uniformity of dielectric constant, adequate adhesion to the support and the electrically conductive layer, and good hygrothermal properties (i.e. substantially constant dielectric constant, dissipation factor (loss of electrical signal sensitivity across the material), and dimensional change, regardless of temperature and humidity).

Although numerous thermotropic and lyotropic liquid crystal polymer can be used, a balanced liquid crystal polymer is preferred due to its multidirectional control of orientation, coefficient of thermal expansion, and modulus (control of stiffness), and low cost. Typical liquid crystal polymer films have mechanical properties that differ in the flow direction from the direction perpendicular thereto. For instance, a typical extruded liquid crystal polymer formed into a film, fiber, or rod, is an order of magnitude or more stronger in the flow direction than in the direction perpendicular thereto, and has a coefficient of thermal expansion which is much lower in the flow direction only. In contrast, a balanced liquid crystal polymer is substantially more uniform in the flow direction and the direction perpendicular thereto. Generally, the balanced liquid crystal polymer has a tensile strength in the flow direction versus perpendicular thereto of less than 10:1, with less than about 5:1 preferred, and about 3:1 or less especially preferred; a coefficient of thermal expansion of less than about 3:1, with less than about 2:1 preferred, and about 1.5:1 or less especially preferred. Possible liquid crystal polymers that can be used with the present invention include, but are not limited to Vectra™, commercially available from Ticona, XyDar™, commercially available from Amoco Polymers, and Zenite™, commercially available from DuPont, among others.

The liquid crystal polymer film can be formed in any conventional manner, such as an extrusion or other process with provisions for making a balanced film. Preferably, blown film extrusion is employed for making a balanced film where a manner of orienting the film, such as counter-rotating extrusion dies with blown film extrusion or T-die extrusion with tentering (bi-axial stretching), is employed.

Sufficient thickness of the liquid crystal polymer film to attain the desired impedance is utilized. Typically an impedance of about 25 to about 75 ohms is employed, with an impedance of about 48 to about 53 ohms preferred. In order to attain such an impedance, and also minimize the dynamic flexural properties of the assembly, the liquid crystal polymer film, which can be a single layer or a series of sub layers, typically has an overall thickness of less than about 2.0 mils, with a thickness of less than about 1.5 mils preferred, and less than 1.0 mil especially preferred.

The electrically conductive layer, which is disposed on the side of the liquid crystal polymer film opposite the support, can be any material capable of functioning as the assembly's circuitry and preferably having a coefficient of thermal expansion similar to that of the support. Typically this layer, which has a sufficient thickness to not restrict current flow while being sufficiently thin to be made into fine circuitry, i.e., generally up to about 2.0 mils thick with about 0.2 to about 0.8 mils preferred, can be a metallic foil such as copper, a copper alloy, and/or other electrically conductive metals and alloys typically used in the circuit industry, including, but not limited to, alloys and mixtures of iron, nickel, silver, aluminum, phosphorous, zinc, manganese, silicone, and others. One example of a copper alloy electrically conductive foil is A.S.T.M. specification number B-465 which comprises about 97.5% copper, 2.35% iron, 0.03% phosphorous, and 0.12% zinc.

Once the electrically conductive layer, dielectric liquid crystal polymer film, and stainless steel layers have been stacked, these layers are preferably laminated together in a conventional manner. Possible laminating methods include, but are not limited to, a lamination press, autoclave, and continuous roll-to-roll lamination, among others, with the preferred method based upon the type of liquid crystal polymer employed (thermosetting or thermoplastic). Furthermore, it is preferred to control the lamination temperature and pressure so as to attain proper flow, adhesion, and final mechanical properties. For example, the stack is placed in a laminating press at a low pressure. While under low pressure, the stack is heated to about 300° C. The stack is then compressed to 500 pounds per square inch (psi) for a sufficient period to flow the liquid crystal polymer, wetting the surfaces of the metal layers, and forming a substantially strong and continuous bond between the various layers.

Once laminated, the laminate is prepared for circuitization using conventional processes. For example, the support and electrically conductive layers can be etched using a conventional etching process such as chemical milling, among others. Chemical milling, for example, comprises cleaning the laminate, attaching a photoresist to protect or mask metallic areas of the laminate which are not to be etched, removing the photoresist from the areas which will be etched, and etching the support, and electrically conductive layer. Possible etchants that can be used with the current process include hydrochloric acid, ferric chloride, and cupric chloride, among others conventionally known in the art.

Once the support and conductive layers have been etched, the liquid crystal polymer could then have features created in it using plasma, reaction-ion, laser etching, or chemical milling. Features could be through holes or windows for access to the backside of one of the metal or to eliminate material so as to minimize the dielectric's impact on the support's flexural properties. Typical plasma etching is performed under vacuum using oxygen ($O_2$) alone or in combination with blends of other chemicals. Usually, about three gases or less are used in combination with the oxygen, although more gases can be employed. Examples of possible gas mixtures include 80 vol % $O_2$, 15 vol % $CF_4$, and 5 vol % $N_2$; and 85 vol % $O_2$ and 15 vol % $NF_3$; among others.

Figure 7:
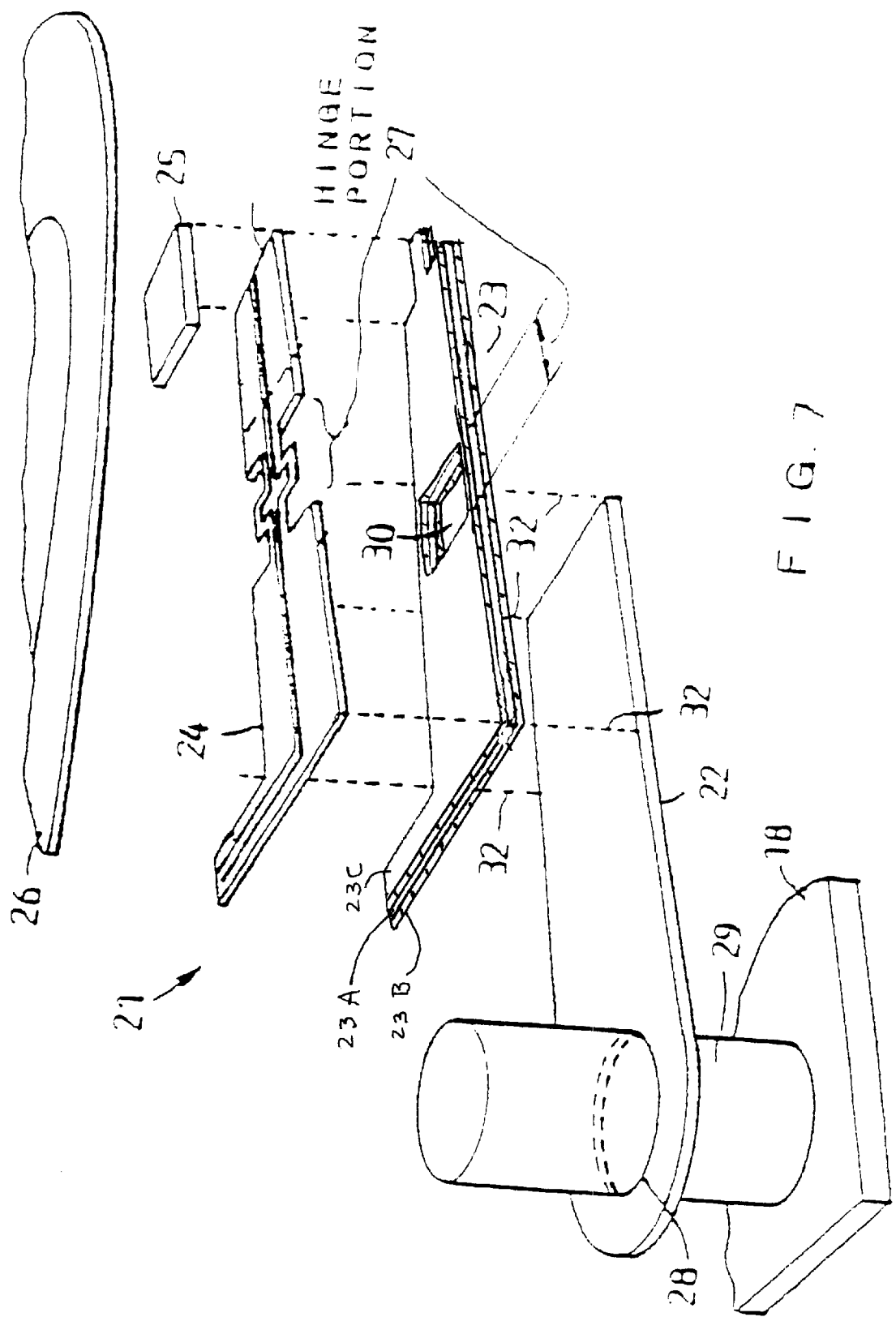
FIG. 7 is an illustration of a suspension assembly including a load beam comprising a liquid crystal polymer disposed between a first metal layer and a second metal layer.

In another embodiment, a suspension assembly comprises a mount plate, a load beam attached thereto, and a circuit element disposed on one side of the load beam. Generally the circuit element is bonded to the load beam by the use of an adhesive or other method known in the art. The load beam comprises a liquid crystal polymer layer disposed between, in intimate contact with, and adhered to a first metal layer and a second metal layer. An example of this embodiment is shown at FIG. 7, which illustrates disk 26 and a suspension assembly 21 that includes a mount plate 22, load beam 23, and a circuit element 24 with a slider 25 mounted on suspension assembly 21. Load beam 23 Comprises a liquid crystal polymer layer 23A disposed between and in intimate contact with a first metal layer 23B and a second metal layer 23C. The mount plate 22 has an aperture 28 and is pivotally mounted on a shaft 29 fixed on the frame 18 of the disk drive.

The load beam 23 includes a rear portion fixed to the free end of the mount plate 22, a front portion, and a central portion defined by the length of aperture 30, which provides the hinge portion 27. One end of the load beam 23 is aligned with the free end of the mount plate 22 as shown by the dashed lines 32 and is fixed to the free end of the mount plate 22. The slider 25 is directly mounted on the circuit element 24.

Suitable liquid crystal polymers for use in load beams are described above. The thickness of the liquid crystal polymer layer, which can be a single layer or a series of sub-layers, is determined by the desired physical properties of the load beam. Good flex and bend properties are typically provided by a liquid crystal polymer layer having an overall thickness of less than about 2.0 mils (50 micrometers), with a thickness of less than about 1.5 mils (37 micrometers) preferred, and less than 1.0 mil (25 micrometers) especially preferred. The liquid crystal polymer layer will typically have an overall thickness greater than about 10 micrometers.

Suitable metal layers include, but are not limited to, stainless steel and copper, aluminum, zinc, iron, transition metals, and their alloys, with stainless steel preferred. There are no particular limitations regarding the shape, size or texture of the metal layers, such considerations being dictated by considerations such as the metal used, the configuration of the suspension assembly, and the desired physical characteristics of the suspension assembly. In view of the usual goal for small components, the thickness of the individual metal layers will generally be from about 30 to about 70 micrometers, with about 32 to about 64 micrometers especially preferred. The thickness of the individual layers may be the same or different. Additionally, the metal layer may be used as obtained from the supplier or after a cleaning procedure such as burnishing.

The liquid crystal polymer may be placed in intimate contact with the metal layers by lamination, by adhesives, or by a combination of the two. Liquid crystal polymer may be coated onto one layer and then laminated or adhered to the second metal layer. Preferably the liquid crystal polymer is provided as a film and simultaneously bonded to the two metal layers by lamination, for example, as described above. The load beam could then be further processed by chemically etching the stainless steel in select areas and by plasma etching the liquid crystal polymer layer where necessary. The load beam can be processed easily and provides excellent localized flex and bend properties, as well as good hygrothermal stability. The flex and bend properties of the load beam are readily adjusted by modification of the composition and/or thickness of the liquid crystal polymer and/or the individual metal layers, as well as their configuration.

The following examples are given by way of illustration, and not by way of limitation.

EXAMPLE 1

The following example can be utilized to form the liquid crystal polymer suspension assembly having an overall thickness of approximately 2.1 mils (54 micrometers); i.e., 18 microns stainless steel, 18 microns liquid crystal polymer, and 18 microns copper.

A 0.7 mil (18 microns) thick thermotropic balanced liquid crystal polymer film (FA-100 from Kuraray Co., Ltd, Osaka, Japan) can be extruded by blown film extrusion.

The liquid crystal polymer film is then disposed between a 0.7 mil (18 microns) thick sheet of A.S.T.M. 302 stainless steel and a 0.7 mil (18 microns) thick A.S.T.M. C 7025 copper alloy foil to form a stack.

The stack can then be laminated in a press (flat bed) lamination process where the stack is placed in the press and compressed to about 100 psi. Once at 100 psi, the stack is heated to a temperature of about 295° C., and then further compressed to a pressure of about 500 psi. The laminate is held at 295° C. and 500 psi for at least 5 minutes prior to being cooled to room temperature and then removed from the press. The lamination process causes the liquid crystal polymer film to melt and adhere to both the stainless steel and copper alloy foil. In preparation for creating a circuit from the laminate, it is first cleaned using conventional techniques.

The cleaned laminate is then coated on both the stainless steel and the copper alloy foil sides, with a photoresist that essentially masks these layers from etchant. The photoresist can be applied to the structure by hot rolling Riston 4106 dry film resist onto the structure and laminating at a temperature of 105° C. and pressure of 30 psi in order to bond the photoresist to the structure.

Areas of the photoresist are then selectively removed to expose the areas of the laminate to be etched. For example, the photoresist layers are exposed to ultraviolet light at about 35 millijoules of energy in order to expose the area where the desired circuit pattern is to be located. The appropriate portions of the photoresist are then removed using conventional means such as an appropriate developing solution.

The exposed photoresist laminate can then be etched using an etching solution comprised, for example, of up to about 75 weight percent (wt %) cupric chloride, up to about 5 wt % hydrochloric acid, and the balance deionized water; of about 39.0 to 44.0 wt % cupric chloride, about 3.20 to 4.00 wt % hydrochloric acid, balance deionized water; or another etching solution conventionally known in the art. The etching can occur at a temperature of about 50° C. for a period of up to about 5 minutes, with less than 1 minute preferred.

Next the liquid crystal polymer dielectric must be selectively removed. Another layer of Riston dry film photo resist is applied to both sides of the laminate, exposed to UV light (defining remaining liquid crystal polymer geometry), and then developed. This laminate could then be placed in a high vacuum plasma etcher (under appropriate temperature, pressure, and gas mix conditions) and have the liquid crystal polymer removed.

If protective plating is to be used (such as nickel-gold, or tri-lead) it would then be plated on the desired circuit areas.

EXAMPLE 2

The following example can be used to form a liquid crystal polymer based suspension. An alternate suspension assembly could be made utilizing a liquid crystal polymer flex circuit material. A thin (less than 4 mils) unreinforced film based material that by nature is flexible. This assembly would consist of a liquid crystal polymer laminate with copper on one side having the circuit traces fabricated using traditional flex circuit processes, then having the entire circuit bonded to a stainless steel support. The magneto-resistive (MR) head would then be attached to the copper circuit in a secondary operation via traditional means.

The stainless steel could be one of a number of grades (such as A.S.T.M. 302) and of the appropriate thickness (about 0.5 to about 2.0 mils) and width for the given geometries and loads. The main function of the stainless steel material is to support the mass of the flex material and magneto-resistive head at the appropriate distance from the rotating storage disk. The liquid crystal polymer laminate could consist of a liquid crystal polymer film material (such as FA-100 from Kuraray) being laminated to rolled copper (such as alloy 110 from Olin). The liquid crystal polymer thickness could range from about 0.4 to about 2.0 mils and the copper could range in thickness from about 0.1 to about 2.0 mils. The preferred thickness is about 0.7 to about 1.0 mils for the liquid crystal polymer, i.e. a thickness sufficient to allow processing in a traditional flex circuit making operation. The preferred copper thickness is about 0.2 to about 0.8, with the thinner copper allowing finer circuit geometries to be fabricated. The liquid crystal polymer flex circuit could then be attached to the stainless steel with an adhesive such as epoxy resin or a single pressure sensitive adhesive (PSA).

The advantage of this approach is that the trace circuitry (those conductive elements etched in the copper foil on the liquid crystal polymer) is created using industry standard flex circuit making techniques. This can be a low cost, high volume process. The advantage of a liquid crystal polymer flex material is that it will provide improved dimensional and electrical performance over a wide range of environmental conditions, thereby improving the device=s reliability.

The following table compares a liquid crystal film assembly versus a conventional polyimide film. As can be seen from the table, the liquid crystal polymer material showed substantially improved hygrothermal properties (water absorption of only 0.04 versus 2.90 for the polyimide and coefficient of water absorbing expansion of 4 versus 12 to 22 for the polyimide), improved dielectric properties when exposed to humidity (volume and surface resistivity), and a seventy percent improvement in bending performance.

| Property | Test Method | Liquid Crystal Polymer (FA-100 Kuraray) | Polyimide |
| --- | --- | --- | --- |
| Water Absorption (wt %) | 23° C., 24 hrs. | 0.04 | 2.90 |
| CWAE[2] (pm/% RH[3]) | 60° C. | 4 | 12 to 22 |
| Modulus (Kg/mm$^2$)[1] | ASTM D882 | 330 | 300 to 600 |
| Volume Resistance ($10^{15}$ ohms ($\Omega$)) | 20° C., 96 hrs, 65% RH | 7.7 | 1.2 |
| Surface Resistance ($10^{13}$ $\Omega$) | 20° C., 96 hrs. 65% RH | 14 | 1.1 |
| Bending Test (No. cycles) | JIS C5016[4] R = 2.0 mm | 4500 | 2600 |

Figure 4:
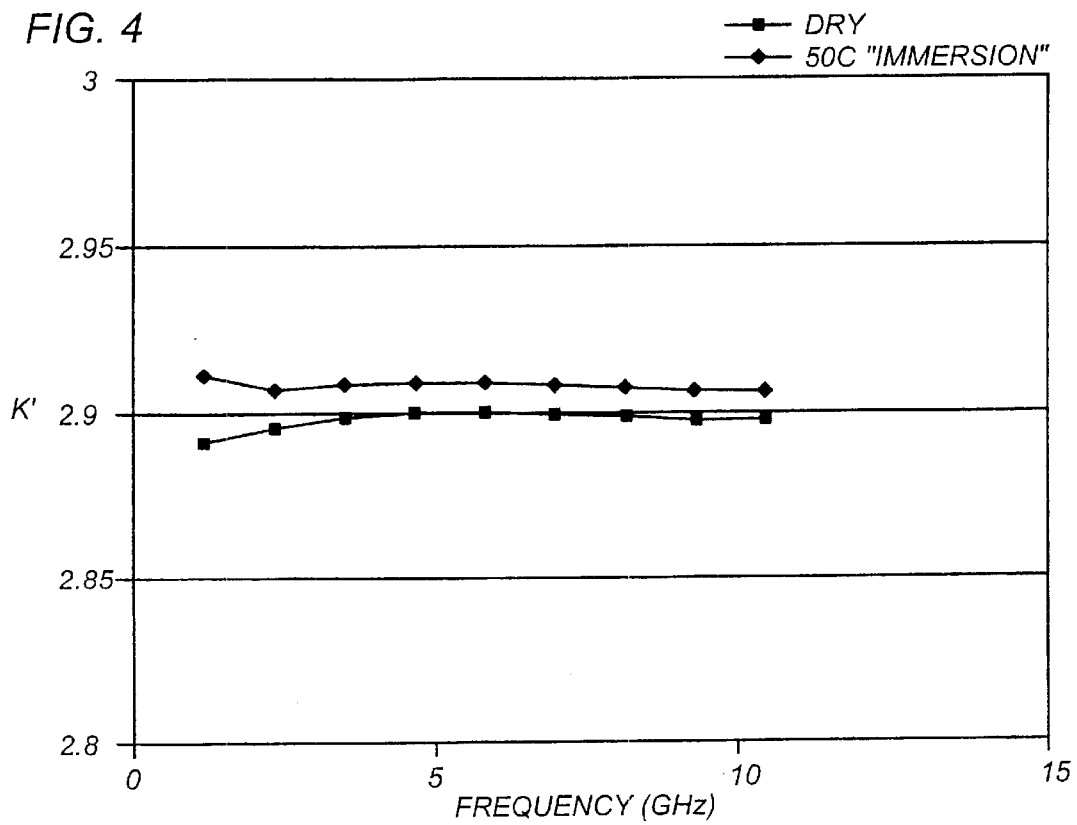
Figure 5:
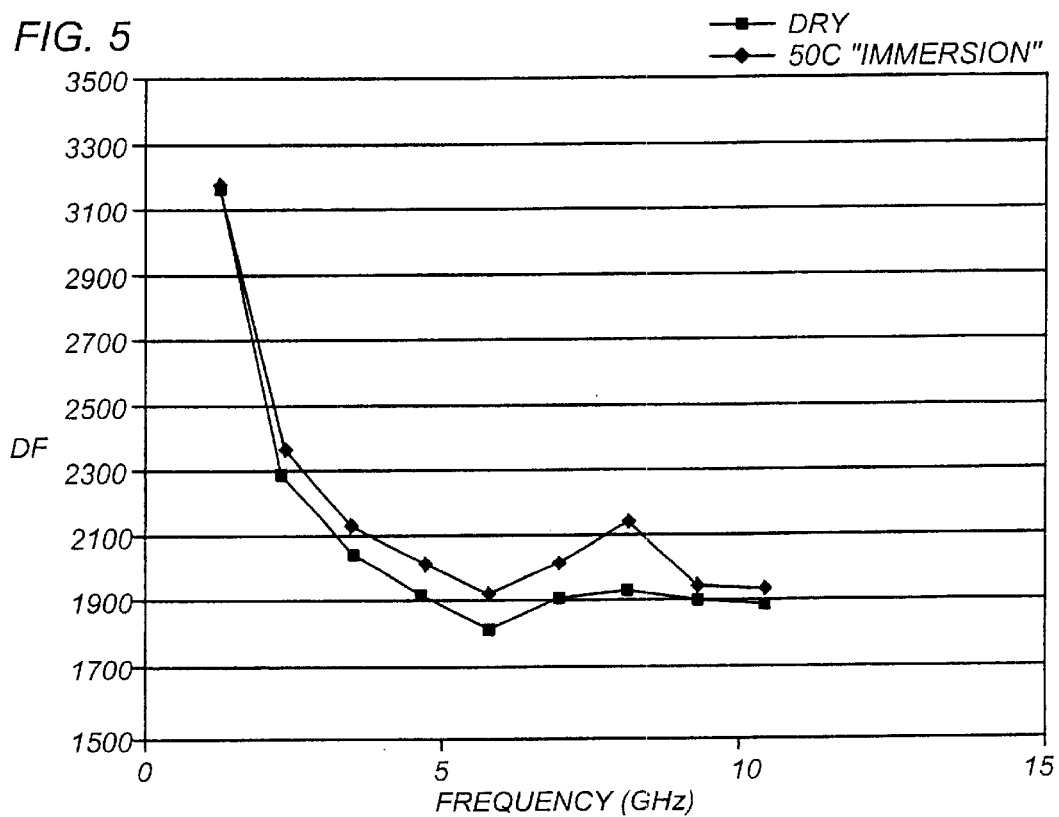
Figure 6:
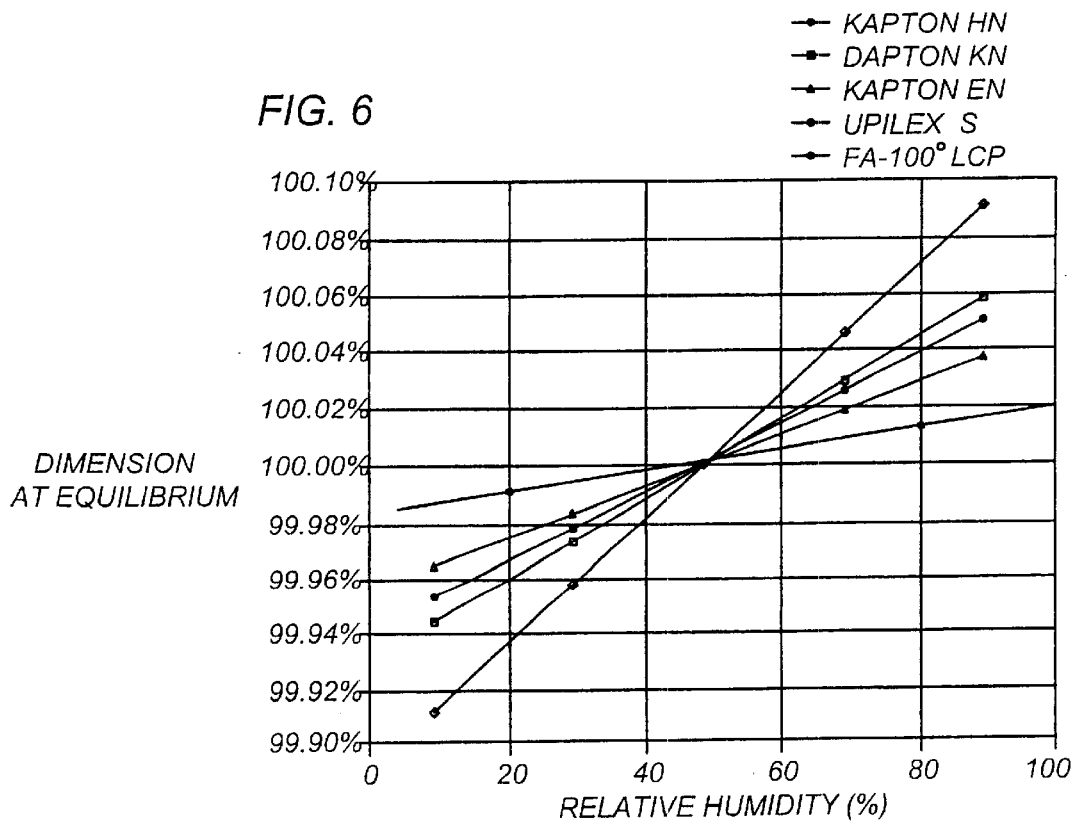
FIG. 6 is a graph of the effect of relative humidity on the dimension at equilibrium of polyimide assemblies.

[1]After lamination
[2]Coefficient of water absorbing expansion
[3]RH is relative humidity
[4]JIS is Japan Industrial Standard In addition to the Table, the hygrothermal stability is further established in FIGS. 2–5 which set forth the liquid crystal polymer assembly dielectric constant versus frequency under dry conditions and under 50% relative humidity at 23° C. (FIGS. 2 and 3), and dielectric constant versus frequency under dry conditions and after immersion in water at 50° C. for 9 days (FIGS. 4 and 5). As is evident from these Figures, the dielectric constant essentially did not vary at 50% relative humidity and only varied slightly after immersion in water for 9 days. In contrast, FIG. 6 shows the dimension at equilibrium versus relative humidity for a polyimide assembly. As is evident from this Figure, the dimension at equilibrium varied significantly with relative humidity.

The rotatable storage device suspension assembly of the present invention possesses a significantly improved resistance to hygrothermal fluctuation compared to conventional polyimide based suspension assemblies, improved dimensional stability due to tailorable coefficient of thermal expansion and low modulus which allows the stainless steel to dominate the laminate modulus, and excellent environmental resistance. Furthermore, when the balanced liquid crystal polymer is employed, the assembly has more uniform properties (compared to unbalanced liquid crystal polymer laminates) improving the ease of manufacture of the circuits themselves.

Compared to conventional suspension assemblies, such as polyimide suspension assemblies, the assembly of the present invention has a low coefficient of hygrothermal expansion (CHE) typically less than about 10 parts per million per percent relative humidity (ppm/% RH), with less than about 5 ppm/% RH preferred, while conventional assemblies have a CHE exceeding about 20 ppm/% RH. Considering that high coefficient of hygrothermal expansion creates flatness problems. Additionally, the assembly of the present invention has a low coefficient of thermal expansion, i.e., about 1.5/1 or less (the flow direction versus the direction perpendicular thereto); and a dielectric constant that is substantially constant with changes in humidity. In contrast, conventional assemblies have coefficient of thermal expansion exceeding 2/1 and typically exceeding 5/1, and the dielectric constant fluctuates with humidity. Consequently, the unique suspension assembly is hygrothermally stable, possesses a substantially constant coefficient of thermal expansion in both the flow direction and the direction perpendicular thereto, and has a dielectric constant (DK) which is substantially unaffected by changes in humidity.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A suspension assembly comprising
   a mount plate having a load beam mounted thereon, and a circuit element disposed on the load beam;
   wherein the load beam comprises a balanced liquid crystal polymer material disposed between, and in intimate contact with a first metal layer and a second metal layer.

2. A suspension assembly as in claim 1, wherein the first metal layer, the second metal layer, or both, is stainless steel.

3. A suspension assembly as in claim 1, wherein the first metal layer and the second metal layer have a thickness of about 30 micrometers to about 70 micrometers.

4. A suspension assembly as in claim 1, wherein the thickness of the first metal layer is different from the thickness of the second metal layer.

5. A suspension assembly as in claim 1, wherein the balanced liquid crystal polymer material has a tensile strength in a flow direction versus a direction perpendicular thereto of less than 5:1.

6. A suspension assembly as in claim 1, wherein the balanced liquid crystal polymer material has a tensile strength in a flow direction versus a direction perpendicular thereto of about 3:1 or less.

7. A suspension assembly as in claim 1, wherein the balanced liquid crystal polymer material has a coefficient of thermal expansion in a flow direction versus a direction perpendicular thereto of less than 1.5:1.

8. A suspension assembly as in claim 1, wherein the balanced liquid crystal polymer material has a coefficient of hygrothermal expansion of less than about 10 ppm/% RH.

9. A suspension assembly as in claim 1, wherein the balanced liquid crystal polymer material has a coefficient of hygrothermal expansion of less than about 5 ppm/% RH.

10. suspension assembly as in claim 1, wherein the balanced liquid crystal polymer material has a dielectric constant which is substantially unaffected by changes in humidity.

11. A suspension assembly as in claim 1, wherein the balanced liquid crystal polymer material has a thickness of about 10 to about 50 micrometers.

12. A suspension assembly comprising:
    a mount plate having a load beam mounted thereon, and a circuit element disposed on the load beam;
    wherein the load beam comprises a balanced liquid crystal polymer material disposed between, and in intimate contact with a first metal layer and a second metal layer, and further wherein the balanced liquid crystal polymer has a tensile strength in a flow direction versus a direction perpendicular thereto of less than 10:1.

13. A suspension assembly comprising:
    a mount plate having a load beam mounted thereon, and a circuit element disposed on the load beam;
    wherein the load beam comprises a balanced, multi-layered liquid crystal polymer material disposed between, and in intimate contact with a first metal layer and a second metal layer.

* * * * *